US006526872B2

(12) United States Patent
Wong

(10) Patent No.: US 6,526,872 B2
(45) Date of Patent: Mar. 4, 2003

(54) COFFEE MAKING MACHINE

(75) Inventor: Ying Man Wong, Hong Kong (HK)

(73) Assignee: Raymond Electric (China) Limited (HK)

( * ) Notice: Subject to any disclaimer, the term of this patent is extended or adjusted under 35 U.S.C. 154(b) by 0 days.

(21) Appl. No.: 09/862,748

(22) Filed: May 22, 2001

(65) Prior Publication Data

US 2002/0029694 A1 Mar. 14, 2002

(51) Int. Cl.[7] .............................................. A47J 31/053
(52) U.S. Cl. .............................. 99/282; 99/299; 99/308; 99/305
(58) Field of Search ........................... 99/308, 309, 310, 99/311, 312, 299, 281, 282, 283, 305

(56) References Cited

U.S. PATENT DOCUMENTS 1,471,933 A * 10/1923 Wertheimer ................. 99/308
5,309,821 A * 5/1994 Knepler ....................... 99/282
5,868,062 A * 2/1999 Enomoto ..................... 99/282

* cited by examiner

Primary Examiner—Reginald L. Alexander
(74) Attorney, Agent, or Firm—Jackson Walker L.L.P.

(57) ABSTRACT

A coffee making machine includes a vessel that supports a fitter basket containing measure of coffee grounds for mixing with hot water in a generally conventional way. A re-circulating passage connects a bottom outlet of the vessel to a top of the basket. A pump and heat exchanger are provided in the re-circulation passage. The pump and heat-exchanger are controlled by a programmable controller unit so that brewing or coffee-making conditions are readily and adjustably controllable by a user.

4 Claims, 1 Drawing Sheet

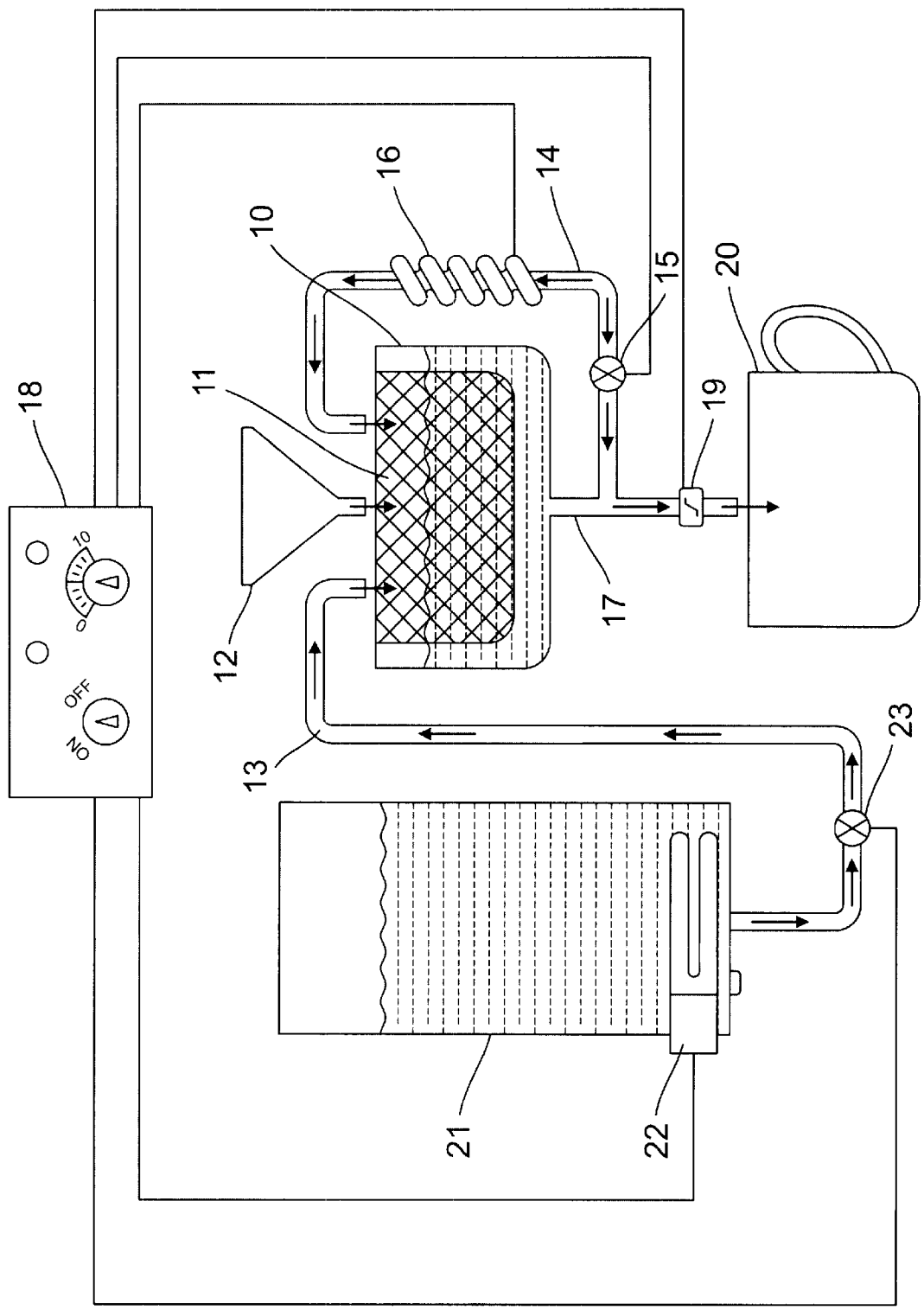

COFFEE MAKING MACHINE

BACKGROUND OF THE INVENTION

1. Field of the Invention

The invention relates to coffee making machines.

2. Description of the Prior Art

Many proposals are available for making batches of coffee, often one or two cups at a time, by mixing hot water and coffee grounds. It is important for the flavour of the coffee produced to control the temperature and the time that the grounds are in association with the hot water in the machine. Normally, hot water is simply dripped or poured into an open top of a container containing coffee grounds and the coffee collected from a bottom out flow port of the container. The 'mixing' time is not controllable at all, or easily controllable. That is, at present there is virtually no control or ready adjustability in the available coffee making machines.

SUMMARY OF THE INVENTION

It is an object of the invention to overcome or at least reduce this problem.

According to the invention there is provided a coffee making machine into which a quantity of hot water is arranged to be supplied into a vessel, an open topped filter basket containing a measure of coffee grounds supported in the vessel, including a re-circulating flow passage connected between a bottom of the vessel and a top of the basket, a heater for heating the coffee in the flow passage, an electric pump for pumping coffee through the flow passage to the top of the basket, and control means arranged to control operation of the heater.

The control means may be arranged to dispense specific quantities hot water to the top of the vessel.

The electric pump may be an in-line pump mounted in a hot water delivery pipe forming the re-circulating flow passage.

BRIEF DESCRIPTION OF THE DRAWINGS

A coffee making machine according to the invention will now be described by way of example with reference to the accompanying drawing which shows a diagrammatic sectional elevation of the coffee making machine.

DESCRIPTION OF THE PREFERRED EMBODIMENTS

Referring to the drawing, a vessel 10 supports a removable filter basket 11 into which a measured quantity of coffee grounds can be dropped via a funnel 12 into a top of the basket and mixed with hot water supplied to the container by a delivery pipe 13. A re-circulating passage 14, which has an in-line electric pump 15 and a heat exchanger 16, is provided to allow coffee to be fed from a bottom outlet 17 of the vessel 10 into the top of the basket 11. This enables controllable and desired mixing, over chosen periods of time, between the hot water and the coffee grounds to take place. The pump 15 and the heat exchanger 16 are controlled by a controller unit 18 so that the coffee is heated and controlled to be at a chosen or predetermined temperature. The heat exchanger 16 normally comprises an electrical heating element, but could comprise a coil through which hot water is flowed, to heat the re-circulating passage 14.

A manually (or automatically) controllable outlet valve 19 can be opened to allow coffee to drain into a cup 20 or other suitable dispenser.

Hot water is normally supplied to the vessel 10 from a hot water reservoir 21, having a base heater 22, via the delivery pipe 13. An in-line pump 23 is controlled by the controller unit 18 to supply initially a suitable measured quantity of hot water to the vessel 10.

The controller 18 may be provided with further control buttons to control the quantity of coffee grounds dispersed into the funnel 12 at the beginning of a brewing cycle, a "one-press" start button, and a button for adjusting the overall timing of each brewing cycle. The components per se hereinbefore described and mentioned are generally well known in the art, such known components include a suitable "programmable" controller unit.

In embodiments of the invention, coffee is uniquely re-circulated via the passage 14 to improve proper mixing and to controllably increase or decrease the temperature of the water in the vessel 10 and the effective exposure time of the coffee grounds. The conditions in the re-circulating passage 14 are controlled or adjusted by a combination the amount of heat supplied by the heat exchanger 16 and the flow rate determined by operation of the pump 15. In any event, maximum flexibility is provided to enable the mixing time and coffee processing conditions to be varied and controlled by the presence of the re-circulation passage 14, as described.

The overall of total quantity of water supplied to the container 10 for each coffee making cycle is under the control of the controller unit 18, as well as the brewing time, which is determined effectively by a time of operation of the pump 22. This allows readily variable adjustments to be made by a user when setting the controller unit 18. In the prior art, only the quantity and quality of coffee grounds, dropped into the vessel 10 for each coffee making cycle, could normally be varied.

In use, a required quantity of hot water, for making one, two or three cups of coffee say, is supplied for each coffee making cycle and the pump 23 is automatically operated for an appropriate specifically chosen period of time by programmable controller unit 18. The required quantity of hot water may alternatively be determined by having a water-level sensor in the vessel 10 that supplies signals to the controller unit for turning OFF the pump 23 when a chosen water level is reached.

I claim:

1. A coffee making machine into which a quantity of hot water is arranged to be supplied comprising:

a reservoir for holding and heating a supply of hot water;

a water feed line for discharging a portion of said hot water supply to a brewing vessel;

an open topped filter basket for retaining a measure of coffee grounds supported in said vessel, said coffee grounds retained below a liquid level of said portion of said hot water retained within said brewing vessel;

a re-circulating flow passage connected between a bottom of said vessel and a top of said basket;

a heater for heating liquid coffee in said re-circulating flow passage;

an electric pump for pumping said liquid coffee through said flow passage to said top of said basket; and control means arranged to control operation of said heater and to set and control a predetermined time period during which said coffee grounds are submerged below said liquid level of said portion of said hot water retained within said brewing vessel.

2. The coffee making machine according to claim 1, wherein the control means is arranged to dispense specific quantities hot water to the top of the vessel.

3. The coffee making machine according to claim 1, wherein the electric pump is an in-line pump mounted in a hot water delivery pipe forming the re-circulating flow passage.

4. The coffee making machine according to claim 1, wherein said re-circulating flow passage injects a portion of brewed liquid coffee exiting said vessel into said basket to immerse the coffee grounds in the hot water and the portion of brewed liquid coffee injected into said basket.

* * * * *